United States Patent
Shi et al.

(10) Patent No.: US 7,284,930 B2
(45) Date of Patent: Oct. 23, 2007

(54) COMPOSITION AND METHOD FOR FORMING A SPRAYABLE MATERIALS COVER

(75) Inventors: Caijun Shi, Buffalo, NY (US); Yanzhong Wu, Mississauga (CA)

(73) Assignee: CJS Technology, Inc., Ontario (CA)

( * ) Notice: Subject to any disclaimer, the term of this patent is extended or adjusted under 35 U.S.C. 154(b) by 722 days.

(21) Appl. No.: 10/689,415

(22) Filed: Oct. 20, 2003

(65) Prior Publication Data
US 2005/0084334 A1    Apr. 21, 2005

(51) Int. Cl.
*B09B 5/00*    (2006.01)

(52) U.S. Cl. .............................. 405/129.1; 405/129.3; 405/129.95; 106/724; 106/778; 106/780; 588/257

(58) Field of Classification Search ............. 405/129.9, 405/129.95; 106/713
See application file for complete search history.

(56) References Cited

U.S. PATENT DOCUMENTS

| | | | |
|---|---|---|---|
| 3,466,873 A | 9/1969 | Present | 61/35 |
| 3,635,409 A | 1/1972 | Brewer | 241/43 |
| 4,002,171 A | 1/1977 | Taft | 604/364 |
| 4,028,130 A | 6/1977 | Webster et al. | 106/697 |
| 4,076,862 A | 2/1978 | Kobeski et al. | 427/136 |
| 4,297,810 A | 11/1981 | Hansford | 47/9 |
| 4,374,672 A | 2/1983 | Funston et al. | 106/706 |
| 4,421,788 A | 12/1983 | Kramer | 427/136 |
| 4,432,666 A | 2/1984 | Frey et al. | 588/257 |
| 4,519,338 A | 5/1985 | Kramer et al. | 118/305 |
| 4,790,691 A | 12/1988 | Freed | 405/263 |
| 4,834,300 A | 5/1989 | Wojciechowski et al. | 241/24.11 |
| 4,909,667 A | 3/1990 | DeMello | 405/129.9 |
| 4,927,317 A | 5/1990 | Acosta | 414/724 |
| 4,950,426 A | 8/1990 | Markowitz et al. | 588/9 |
| 5,024,770 A | 6/1991 | Boyd et al. | 210/747 |
| 5,040,920 A | 8/1991 | Forrester | 405/129.15 |
| 5,054,962 A | 10/1991 | Bahnmuller et al. | 405/129.6 |
| 5,082,500 A * | 1/1992 | Nachtman et al. | 106/900 |
| 5,096,616 A | 3/1992 | Kittle | 516/14 |
| 5,133,991 A | 7/1992 | Norman et al. | 427/136 |
| 5,161,915 A | 11/1992 | Hansen | 405/129.9 |
| 5,181,803 A | 1/1993 | Smith et al. | 405/129.9 |

(Continued)

OTHER PUBLICATIONS

Answer 8 of 15 Chemical Abstracts on STN☐☐☐☐WO 9964368 Jeszensky et al. (Dec. 16, 1999) abstract only.*
Answer 64 of 83 Chemical Abstracts on STN☐☐☐☐EP 537999 Colegrave et al. (Apr. 21, 1993) abstract only.*
Answer 77 of 135 Chemical Abstracts on STN☐☐☐☐CA 2184047 Trieu (Feb. 25, 1997) abstract only.*

(Continued)

*Primary Examiner*—Paul Marcantoni
(74) *Attorney, Agent, or Firm*—Nields & Lemack (57) ABSTRACT

An alternative cover for landfill may be formed from a slurry mixture of water, cementitious binder, adhesion enhancing admixture and fiber. These constituents may be mixed and applied to cover landfilled wastes, granular material piles or for soil erosion control. The cover will harden to minimize water infiltration, wind blown dust, odor and affinity to birds, flies and other insects. The water may include tap water, landfill leachate and wastewater. The binder may include Portland cement, blended cement, cement kiln dust, class C fly ash, and/or calcium sulphate hemihydrate. The adhesion enhancing admixture includes water-dispersible polymers. The fibers may comprise shredded paper or wood or plastic fibers.

10 Claims, 3 Drawing Sheets

U.S. PATENT DOCUMENTS

| | | | |
|---|---|---|---|
| 5,215,786 A | 6/1993 | Kittle | 427/244 |
| 5,244,311 A | 9/1993 | Galante | 405/129.15 |
| 5,275,508 A | 1/1994 | Hansen | 405/129.9 |
| 5,320,450 A | 6/1994 | Smith | 405/129.9 |
| 5,385,607 A | 1/1995 | Kiesewetter et al. | 106/172.1 |
| 5,416,133 A | 5/1995 | Garcia et al. | 523/124 |
| 5,516,830 A * | 5/1996 | Nachtman et al. | 524/446 |
| 5,525,009 A | 6/1996 | Hansen | 405/129.9 |
| 5,536,116 A | 7/1996 | Lamers et al. | 405/129.9 |
| 5,556,033 A * | 9/1996 | Nacthman | 239/343 |
| 5,696,174 A * | 12/1997 | Chao et al. | |
| 5,849,364 A | 12/1998 | Nachtman et al. | 427/421 |
| 5,853,050 A | 12/1998 | Kittle | 169/47 |
| 5,855,664 A | 1/1999 | Bielecki et al. | 405/129.9 |
| 5,975,801 A | 11/1999 | Burns, Sr. et al. | 405/129.9 |
| 6,096,373 A * | 8/2000 | Nachtman et al. | 427/136 |
| 6,110,271 A | 8/2000 | Skaggs et al. | 106/804 |
| 6,264,400 B1 | 7/2001 | Gent | 405/129.75 |
| 6,435,770 B1 | 8/2002 | Shi | 405/129.9 |
| 6,550,750 B1 | 4/2003 | Kalkstein et al. | 261/76 |
| 6,558,079 B1 | 5/2003 | Kozak et al. | 405/129.15 |
| 6,558,080 B2 | 5/2003 | Kozak | 405/129.9 |
| 6,579,570 B1 | 6/2003 | Lang et al. | 427/421 |
| 6,586,529 B2 | 7/2003 | Mumick et al. | 525/221 |

OTHER PUBLICATIONS

Airtrol Geobinder; "Despite steep slopes and heavy rainfall, AIRTORL is effective in preventing soil erosion".

Cement and Concrete Composites 20 (1998) p. 171-188; Kamal H. Khayat; "Viscosity-Enhancing Admixtures for Cement-Based Materials-An Overview".

Wisconsin Statewide Waste Characterization Study Summary 2002.

Earth Tech Canada, Inc.; "Waste Latex Paint Re-Use Project"; The Waste Diversion Organization and the City of London; Final Report—Jun. 22, 2001.

1999 Coal Combustion Product (CCP) Production and Use (Short Tons) American Coal Ash Association (ACAA).

Integrated Waste management Board; "Drywall Recycling"; 7-pages.

Southwest Environment Services, Inc.—Alternate Daily Cover for Landfills; 4-Pages.

* cited by examiner

COMPOSITION AND METHOD FOR FORMING A SPRAYABLE MATERIALS COVER

FIELD OF THE INVENTION

This invention relates to compositions producing a synthetic cover for bulk material piles, including waste and soil, and for soil erosion control. Constituents for the cover include water, cementitious binder and viscosity enhancing agents. These constituents are mixed to form a slurry, which is distributed over a material pile or soil surface. The cover will harden to minimize water infiltration, nuisance fugitive dust, odor, and affinity to birds, flies and other insects. Inert fillers and fiber can be added to the slurry mixtures.

BACKGROUND OF THE INVENTION

During shipping, processing, storage, or disposal bulk materials may concentrate in a particular area or site. Bulk materials concentrated into piles must be covered to minimize or prevent blowing dust or debris; water damage; odor; prevent fires; or movement or erosion of material; or prevent vectors such as birds, flies, and/or other insects from feeding thereon. Typically bulk materials are covered by spreading a synthetic material such as a tarp or foam over exposed portions of the pile. For example, in power plants, piles of coal may be covered by spreading an elastomeric geomembrane thereon; the thickness and construction of the membrane depends on the length of time the pile is to remain covered and the expected climatic conditions. One problem associated with the use of membrane covers is the high labor cost and worker safety concerns associated with physical placement of such membranes.

Regulatory agencies require that landfills must be covered at the end of every workday in order to minimize the potential for odors, ground water contamination, fires, blowing litter, disease vectors, and vermin infestation. Many current regulations require daily coverage of exposed waste with a daily cover including a minimum of six (eight in some locations) inches of soil applied to the landfill workface. Due to the non-homogeneous layout of most landfills, such a layer of soil may actually reach from 12 to 15 inches in height in certain areas in order to ensure that the six-inch minimum cover exists throughout. It is estimated that the use of a six-inch soil daily cover will use up 25% of the total landfill space. The use of soil daily cover also requires a significant amount of labor and heavy-duty equipment to transport and compact the soil. Because waste storage capacity is a landfill's most precious commodity, the traditional soil method of covering the waste has become less and less popular in recent years. In response to the recent demands for more efficient usage of landfill space, alternative daily cover, or ADC, systems have been attracting more and more attention during the past decade. The primary goal of an ADC is to perform all of the functions of a six to eight inch layer of soil without the drawback of consuming large amounts of landfill capacity.

U.S. Pat. No. 4,421,788 to Kramer et al. describes a hardenable plastic foam cover which is formed by spraying over waste materials. Similarly, companies such as 3M Environmental Protection Products of St. Paul, Minn., Chubb Environmental Security of Exton, Pa., and Russmer of Westchester, Pa., all have developed synthetic foams which can be sprayed to function as a daily cover. The foam spray solution is expensive, typically 12 to 15 cents per square foot, substantially more expensive than soil. Also, the safety of these chemical formulations has been questioned and their effect upon ground water quality remains unknown.

Another disadvantage of the daily foam cover substitutes is that they cannot be easily formulated from recycled materials. The increasing sensitivity towards the environment by the general population has greatly increased the demand for recycled products. Federal, state, provincial and municipal environmental officials, who operate or regulate most landfills, have been especially active in encouraging the use of recycled products. Among the advantages of recycling is the fact that the waste material is converted into useful products rather than taking up rapidly vanishing landfill space. Hence, such officials are making great efforts to integrate recycled materials into operations under their control, including landfill operations.

Another alternative to using soil as a daily cover is disclosed in U.S. Pat. No. 4,909,667 to DeMello and U.S. Pat. No. 4,927,317 to Acosta, DeMello and Acosta disclose a geotextile or sheet-like member, such as canvas and the like, which is laid over the working face of a landfill at the end of the operating day. A key disadvantage of geotextile covers is their expense which may be as high as $2.25 per square yard. In addition, geotextiles are subject to mechanical damage, such as tears, punctures, requiring replacement or repair. Moreover, these covers are difficult to apply in inclement weather.

A daily cover system and method for production of a cover system has been disclosed in U.S. Pat. No. 5,161,915 issued Nov. 10, 1992, and U.S. Pat. No. 5,525,009 issued Jun. 11, 1996 to Hansen. The cover system primarily uses cement kiln dust or Portland cement and fly ash, or Portland cement and crushed stone dust as a binder. Many landfill operations have experienced problems with this type of cover with adherence to plastics and glass in the landfilled waste.

U.S. Pat. No. 5,516,830 to Nachtman, et al discloses a composition which composes gypsum, water-soluble cellulosic polymer and fiber. In the of U.S. Pat. No. 6,096,373 to Nachtman et al, it discloses a landfill cover composition and method, which uses setting material, water soluble cellulosic polymer, fibrous material, a foam producing agent and water for forming a foamed outdoor protective cover layer. The mixing system contains a foam generator, which makes the mixing process and equipment very complicated. Actually, most of the air bubbles in the foamed slurry will break during the spray, especially.

United States Gypsum Company has been marketing an industrial grade gypsum based product called Airtrol Plaster®, which is mixed with cellulose fiber mulch and water to form a slurry and is sprayed for a landfill cover or erosion control. Recently, in U.S. Pat. No. 6,435,770 to Shi discloses a cover system which uses processed dry walls as binder. The gypsum based cover systems also have problems with adherence to plastics and glass in the landfilled waste.

Latex paint now accounts for over 80% of consumer paint. A survey in by the Wisconsin Department of Natural Resources contracted with Cascadia Consulting Group in 2002 indicated that the quantity of latex paint in landfilled wastes could be up to 0.3%, with an average of 0.1%. Latex paint or paint sludge may be dried prior to disposal in a landfill. Paint recycling programs have been established in some jurisdictions to recover the paint for recycling. However waste latex paint or paint sludge from recycling operations is still a significant post-consumer product that needs management.

SUMMARY OF THE INVENTION

In view of the above stated limitations and shortcomings of landfill daily covers there still exists a need in the art to develop an alternative cover which uses inexpensive, widely available, and environmentally friendly recycled materials, and exhibits good performance.

More specifically, it is therefore an object of the present invention to provide a sprayable cover for bulk piles which has a good adherence to plastics and glass in the landfilled waste.

It is therefore an object of the present invention to provide a cover for bulk piles which is inexpensive to apply and poses no safety risk to attendant personnel.

More specifically, it is a purpose of this invention to provide a method of manufacturing a sprayable cover which uses widely available recycled materials or by-products as a binder.

A further objective of this invention is to be able to provide a sprayable cover that can form and harden within a short period of time.

The aforementioned objectives are achieved by a sprayable cover in accordance with the present invention.

This invention provides a composition for a cover or bulk piles and control or prevention of soil erosion. The cover may contain approximately 30 to 70% liquid, approximately 5 to 60% cementitious binder, 0.1 to 5% of an adhesion enhancing admixture, up to about 60% powder filler, and up to about 5% fiber.

The liquid can include water, landfill leachate, and/or industrial wastewater. Cementitious binders include portland cements as per ASTM C150, blended cement as per ASTM C595, masonry cement as per ASTM C91, calcium aluminate, slag cement, alkali-activated slag cement, ASTM Type C coal fly ash, cement kiln dust, calcined gypsum as per ASTM C28, or a combination of two or more of them.

Adhesion enhancing admixture (AEA) is preferably a water-dispersible polymer selected from acrylics, alkyd resins, epoxy resins, polyesters, amino resins, acrylic-modified water-soluble alkyds, silicon-modified alkyd, polyester or a combination of two or more of them. In this invention, waste water-based paint or paint sludge is preferred.

Inert powder fillers may include ASTM Class F flyash, fine sand, ground silica, ground glass powder, clay or crushed stone dust. In this invention, it is a type F flyash with a high carbon content from 8 to 30% which is preferred.

The fibers may include cellulose such as shredded paper, finely shredded wood fibers, chopped straw, or hay. The fibers may also include plastic fibers such as polyethylene terephthalate.

The synthetic cover in the present invention can be formed by filling a mixing tank with a predetermined amount of liquid constituent such as water, landfill leachate, or industrial wastewater. The proper amounts of adhesion enhancing admixture such as waste latex paint, or latex paint sludge, and fibers, if applicable, are then loaded into the mixer. The agitator is activated to mix the latex paint, or latex paint sludge, and fibers with the liquid. Typically, it is necessary to run the agitator for approximately a minute or longer to adequately mix the constituents. The powder fillers are then placed in the mixer where it is thoroughly mechanically mixed with the liquid, cellulose and possibly plastic fibers. The mixing time may vary depending upon the percentage of each constituent. However, the materials should be mixed until the mixture has a thick, viscous "milk shake" consistency. Those skilled in the art will appreciate that the order of addition of the components of the mixture is not critical and that the foregoing order of addition is provided for illustration only and is not to be limiting.

After the mixture is properly agitated, it is uniformly sprayed onto the bulk pile surface using a conventional hydroseeding machine. The thickness of the sprayed layer varies from one-eighth to one-half of an inch. After the entire surface area has been sprayed, the slurry will adhere to the bulk pile or soil and cohere to itself, and will harden within several hours.

Other ingredients can be advantageously added to the composition such as one or more of the following additives: a thickening agent, a pigment, and an odor control agent.

DETAILED DESCRIPTION OF THE PREFERRED EMBODIMENTS

The invention also incorporates a composition of a cover for bulk material piles and soil erosion control, comprising approximately 30 to 70% liquid, about 5 to 60% cementitious materials, up to 60% inert filler, up to 5% adhesion enhancing agent, and up to 5% of additional fiber. These constituents may be mixed and form a slurry, which is sprayed to form an effective cover layer over soil, refuse at a dump site, or granular material in a stockpile. Typically, the slurry will form and harden within several hours.

According to ASTM C11, cementitious materials refers to materials that, when mixed with water, provide the plasticity and the cohesive and adhesive properties necessary for placement and the formation of a rigid mass. The constituents which may be used as binders in the present invention are cementitious materials that include portland cements as per ASTM C150, blended cement as per ASTM C595, masonry cement as per ASTM C91, calcium aluminate, slag cement, alkali-activated slag, ASTM Type C coal fly ash, cement kiln dust (CKD), calcined gypsum as per ASTM C28, or a combination of two or more of them.

According to ASTM C 150, portland cement is defined as "hydraulic cement (cement that not only hardens by reacting with water but also forms a water-resistant product) produced by pulverizing clinkers consisting essentially of hydraulic calcium silicates, usually containing one or more of the forms of calcium sulfate as an interground addition." Clinkers are nodules (0.5-25 mm diameter) of a sintered material that is produced when a raw mixture of predetermined composition is heated to high temperature. The low cost and widespread availability of the limestone, shales, and other naturally occurring materials make portland cement one of the lowest-cost materials widely used over the last century throughout the world. Eight types of cement are covered in ASTM C 150—I, II, III; IV, V, IA, IIA and IIIA. All are suitable for use in the present invention. Type I portland cement is a normal, general-purpose cement suitable for all uses. It is used in general construction projects such as buildings, bridges, floors, pavements, and other precast concrete products. Type IA portland cement is similar to Type I with the addition of air-entraining properties. Type II portland cement generates less heat at a slower rate and has a moderate resistance to sulfate attack. Type IIA portland cement is identical to Type II and produces air-entrained concrete. Type III portland cement is a high-early-strength cement and causes concrete to set and gain strength rapidly. Type III is chemically and physically similar to Type I, except that its particles have been ground finer. Type IIIA is an air-entraining, high-early-strength cement. Type IV portland cement has a low heat of hydration and develops strength at a slower rate than other cement types, making it ideal for use in dams and other massive concrete structures where there is little chance for heat to escape. Type V portland cement is used only in concrete structures that will be exposed to severe sulfate action, principally where concrete is exposed to soil and groundwater with a high sulfate content.

Blended hydraulic cements are produced by intimately blending two or more types of cementitious material. Primary blending materials are portland cement, ground granulated blast-furnace slag, fly ash, natural pozzolans, and silica fume. These cements are commonly used in the same manner as portland cements. Blended hydraulic cements conform to the requirements of ASTM C595.

Masonry cements are hydraulic cements designed for use in mortar for masonry construction and are suitable for use in the present invention. They are a mixture of portland cement, air entraining materials, and plasticizing materials (such as limestone or hydrated or hydraulic lime), together with other materials introduced to enhance one or more properties such as setting time, workability, water retention, and durability. These materials are proportioned and packed at a cement plant under controlled conditions to assure uniformity of performance. Masonry cements meet the requirements of ASTM C 91, which classifies them as Type N masonry cement and Type S masonry cement.

Slag cement refers to ground granulated blast-furnace slag (GGBFS), which has been used in concrete for over a century and are suitable for use in the present invention. GGBFS has a vitreous structure and exhibits significant cementitious property when mixed with water alone. The addition of alkaline activators can activate potential cementitious property of GGBFS and gives strength higher than conventional portland cement.

Coal fly ash is the finely divided mineral residue resulting from the combustion of ground or powdered coal in electric generating plant. Based on ASTM Specification C618, coal flyash is classified into Class C and Class F. Flyash belongs to Class F if its ($SiO_2+Al_2O_3+Fe_2O_3$) concentration is greater than 70%, and belongs to Class C if its ($SiO2.+Al_2O_3.+Fe_2O_3$) concentration is at least 50% and less than 70%. Usually, Class F flyashes have a low concentration of CaO and exhibit pozzolanic properties, but Class C flyashes contain up to 20% CaO and exhibit cementitious properties. Both are suitable for use in the present invention. Type C flyash has cementitious properties and can be directly used as a binder.

Cement kiln dust (CKD) is a fine material that is carried by hot gasses in a cement kiln and collected by a filter system during the production of cement. It is composed primarily of fine ground particles of limestone, clay or shale, lime, sodium, potassium chlorides, sulphates, metal oxides, calcium silicates and other salts. Calcium silicates in CKD can act as binders. Reactive silica from original or heated clay in a CKD can react with lime to form a binder directly. Thus, a CKD with high lime and calcium silictae content can be a good binder and is suitable for use in the present invention.

Calcined gypsum ($CaSO_4.1/2H_2O$), also called plaster or plaster of Paris, is suitable for use in the present invention, and is a fine white powder composed of calcium sulphate hemihydrate. It is produced by heating gypsum (calcium sulphate dihydrate) to temperatures below 250° C. (150°-160° C.) to drive off some of the water of crystallisation.

All these cementitious materials hydrate in the presence of water and produce hydration products, such as calcium silicate hydrate, calcium aluminate hydrate, calcium aluminosilicate hydrate, calcium aluminosulphate hydrates, calcium sulphate dihydrate, etc. The hydration of these cementitious materials results in the setting and hardening of the slurry. These hydration products act as binders. Thus, the sprayed slurry will stick on components in the landfilled wastes such as plastics, glass, etc.

The constituents which may be used as powder fillers in the present invention include ASTM Class F coal flyash, pulverized silica, or ceramics, shredded paper, pulverized waste glass, crushed stone dust, or shredded construction and/or demolition debris. For filler purposes, Class F flyash should be used. In this invention, it is preferred to use a Class F flyash containing a high carbon content.

Construction and demolition debris comprises waste materials associated with the razing of buildings, roads, bridges, and other structures and/or debris associated with the construction or renovation of buildings. It typically includes, but is not limited to, ferrous and non-ferrous metals, concrete, bricks, lumber, plaster and plasterboard, insulation material, shingles and roofing material, floor, wall and ceiling tile, asphalt, glass, pipes and wires, carpet, wallpaper, felt and other items physically attached to the structure, including compacted appliances, structural fabrics, paper or cardboard packaging. Typically excluded from construction and demolition debris are materials that pose an undue risk to public health or the environment such as industrial waste or by-products, oil based paint, tar, solvents, creosote, adhesives and the like. Construction debris should be shredded into a size smaller than one-eighth of an inch.

AEAs in this invention refer to water-dispersible polymers, commonly referred to as latexes, which function by increasing the bonding between the sprayed cover and the substrate through physical and chemical actions. Examples include acrylics, alkyd resins, epoxy resins, polyesters, amino resins, acrylic-modified water-soluble alkyds, silicon-modified alkyd and polyester. They are made by emulsion polymerization and consist of very small particles of the polymer (0.1-10 μm) dispersed in water (the emulsion). Recently, redispersible polymer powders—Dow Latex Powders, have been commercialized by Dow Chemicals. When the water evaporates, these small particles come together to form a continuous film which holds to the surface of substrate and forms a continuous film. It is generally agreed that bonding between the film and the surface of substrate include both physical and chemical bonds. Suitable redispersible polymers include vinylacetate homopolymers, vinylacetate/Vinyl-Versatate copolymers and vinylacetate/ethylene copolymers. These polymers are available in powder form.

Latexes are the most commonly used emulsion polymers in water-based surface coatings and paints. The other major component used in the paint is pigment. The pigments used in paint serve several purposes. The pigments help: (1) to hide the surface on which they are being applied, (2) to provide a decorative effect through the particular colour of the paint film, and (3) to provide durability as well as other surface characteristics such as washability, gloss, etc. When the paint dries, the water evaporates, and the pigment and vehicle particles bind together, forming a strong film.

Latex-based polymers are also being widely used in concrete to produce latex modify concrete, which has greater mechanical strength, markedly better resistance to penetration by water and salt, greater resistance to freeze-thaw damage than Portland cement concrete; and excellent bonding to steel reinforcing and to old concrete. Thus, it can be expected that the use of latex-based polymers resins in sprayed cover slurry can greatly increase the adherence of the cover with components in the landfilled wastes.

Latex paint accounts for over 80% of the consumer paint sold and is a significant post-consumer product that needs management. In 2002, the Wisconsin Department of Natural Resources contracted with Cascadia Consulting Group to conduct the first statewide waste composition study at 14 Wisconsin municipal solid waste landfills and found that the amount of latex sludge could be up to 0.3% of landfilled wastes, with an average of 0.1%. At the moment, the most common practice is to dry the waste paint or paint sludge, then landfill them. In this invention, it is preferred to use a waste latex paint or paint sludge as the AEA of the sprayed cover.

The component used in the liquid portion of the mixture may include water, landfill leachate, and/or industrial wastewater. Although any of these liquids will suffice, water is preferred since it is readily available. Water quality may vary including turbid, polluted, and/or non-potable water. Industrial wastewater may also be used. These may be effective as a liquid constituent provided that they do not contain materials which react with other constituents during mixing. Landfill leachate, created by percolation of water through buried refuse at a landfill, can also be used. Disposal and treatment of landfill leachate are troublesome and expensive, the use of landfill leachate may provide an effective method of its disposal. It should be noted that use of landfill leachate and industrial wastewater as the liquid component may require increased safety precautions.

The fibers of the present invention include shredded paper, wood, textile, chopped straw and hay, glass and plastic fibers. Shredded newspaper or shredded mixed waste paper should be preferably used because of their physical properties and commercial availability. These fibers can include shredded magazines, phone books, corrugated containers, junk mail, office paper, etc. Shredded wood fibers may also be used as a component provided that the wood is finely shredded. The wood fiber must be in a string or hair-like shape such as fine excelsior. Wood chips are not satisfactory for use as a cellulose fiber constituent.

Fibers are preferably short in length and narrow in diameter, approximately ⅛ inch in diameter and ½ inch in length being the maximum size for a sprayable composition. A thickening agent can be included to further increase the viscosity of the slurry. It can be selected from methyl cellulose, methyl hydroxypropyl cellulose, hydroxyethyl cellulose, and hydroxypropyl cellulose, and mixtures thereof. It is preferred to use from 0.01 to 2% by weight in the mixture.

A pigment can be included in the slurry to add an aesthetic quality of the cover. In addition, an odor control agent can be added to the slurry for landfill daily cover.

The synthetic cover in the present invention is formed by filling a mixing tank with a predetermined amount of liquid constituent such as water, landfill leachate, or industrial wastewater. The proper amount of fiber is then loaded into the mixer. The agitator is activated to mix the cellulose fibers with the liquid. Typically, it is necessary to run the agitator for approximately a minute or longer to adequately mix the constituents. The cementitious material and powder fillers are then placed in the mixer where it is thoroughly mechanically mixed with the liquid and fibers. The mixing time may vary depending upon the percentage of each constituent. However, the materials should be mixed until the mixture has a thick, viscous "milk shake" consistency. Again, the order of addition of the components is not critical.

After the mixture is properly agitated, it is uniformly sprayed onto the bulk pile surface using any conventional hydroseeding machine. The thickness of the sprayed layer varies from one-eighth to half an inch. After the entire surface area has been sprayed, the slurry will adhere to the bulk pile or soil and cohere to itself, and will harden within hours. Since the setting time may be short, the pile should be sprayed very quickly and the applicator and mixing unit must be cleaned immediately thereafter. Typically, water will suffice to clean the apparatus.

The present invention is also directed to a dry mixture comprising suitable amounts of cementitious material and filler, that upon addition of the liquid component(s) (which in one embodiment can include the latex), forms a pumpable slurry capable of spray application to bulk material, and that adheres to the bulk material (including plastic) both in the slurried state and upon drying or setting.

In another embodiment, the present invention is directed to a dry mixture comprising suitable amounts of cementitious material, filler, and a powdered redispersible polymer, that upon addition of the liquid component(s), forms a pumpable slurry capable of spray application to bulk material, and that adheres to the bulk material (including plastic) both in the slurried state and upon drying or setting.

EXAMPLE 1

Figure 1:
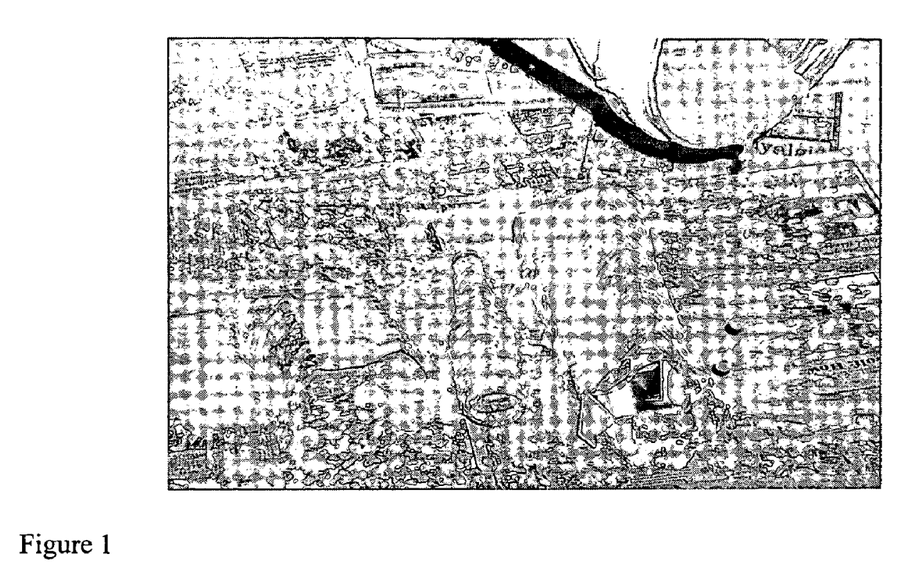
FIG. 1 is a photograph showing the pouring of mixed slurry onto glass bottles and plastic wrapper.
Figure 2:
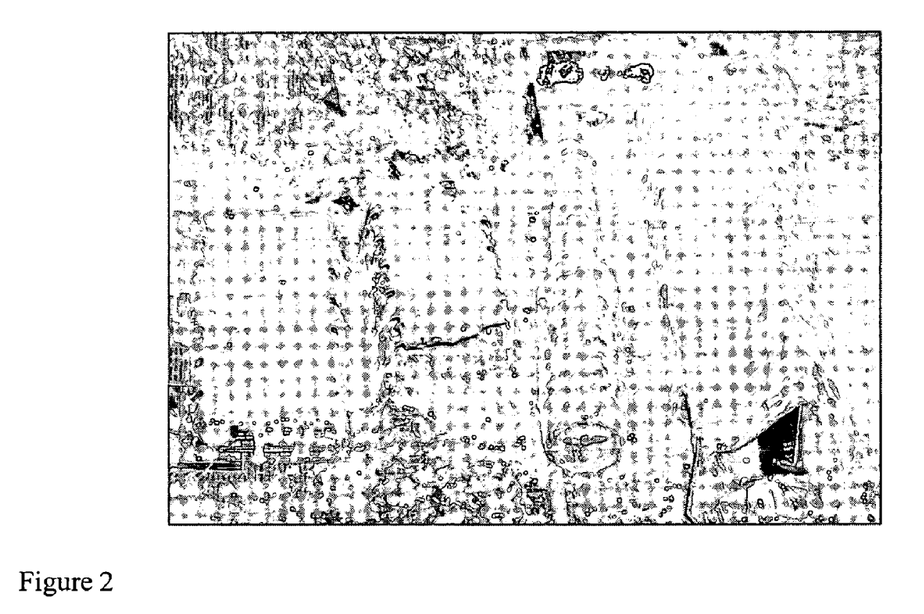
FIG. 2 is a close-up photograph showing a covered glass bottle and plastic wrapper.

A cover composition was designed utilizing constituents and parameters shown in Table 1. In this experiment, conventional Portland cement was used as a binder and latex emulsion was used as an adhesion enhancing agent. These constituents were mixed as previously discussed. The mixture was then applied as a cover on a tray of waste materials containing glass bottles and plastic wrapped wastes. The mixture had sufficient viscosity which adhered to the glass bottles and plastic wrappers, formed a continuous cover and hardened within a few hours. FIGS. 1 and 2 show the pouring of the slurry onto glass bottles and plastic bags. It can be seen that the slurry stuck onto the bottles and plastic wrappers very well and that a continuous cover formed on the surface of the bottles and plastic wrappers.

Figure 3:
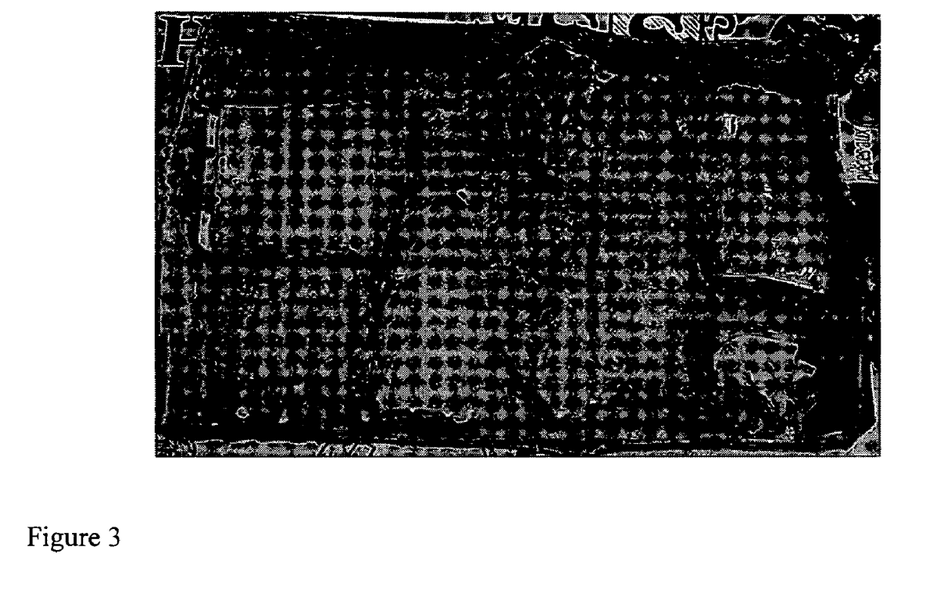
FIG. 3 is a photograph showing the covered glass bottle and plastic wrapper of FIG. 2 after three months of weathering outside.

The cover over the glass bottles and plastic wrappers was placed in the ambient outdoor environment and exposed to sunlight and rain during the months of July, August and September for a period of more than 10 weeks and has undergone more than 20 cycles of wet and dry weather yet remains in excellent condition with minimal shrinkage and no cracking. FIG. 3 is the picture of the cover on the surface of glass bottles and plastic wrapped wastes after more than 20 cycles of wet and dry weathering.

Figure 4:
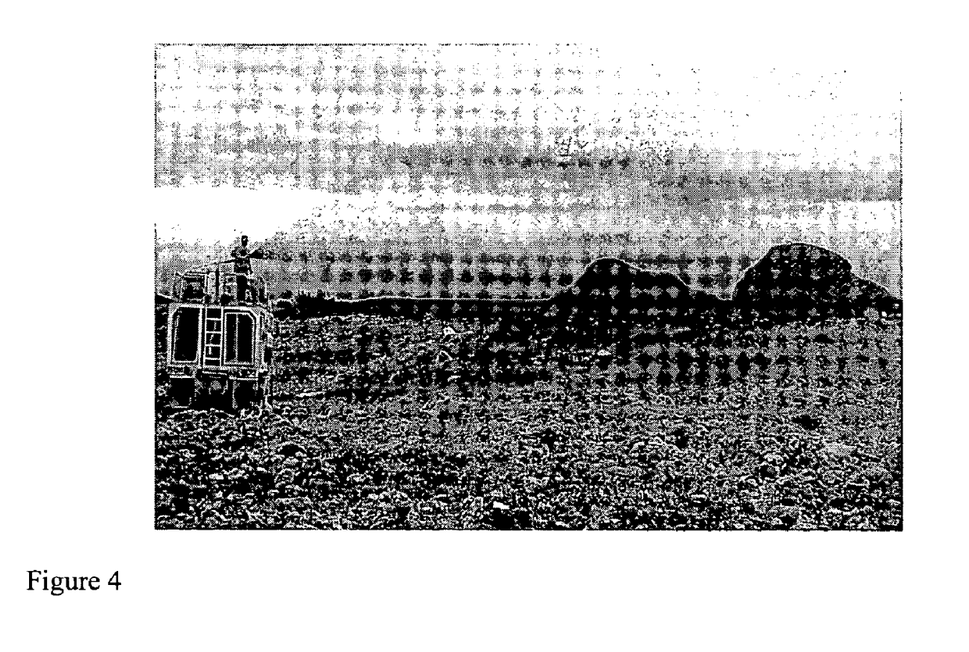
FIG. 4 is a photograph showing the spraying of the mixed slurry onto the face of a landfill using a conventional hydroseeding machine.
Figure 5:
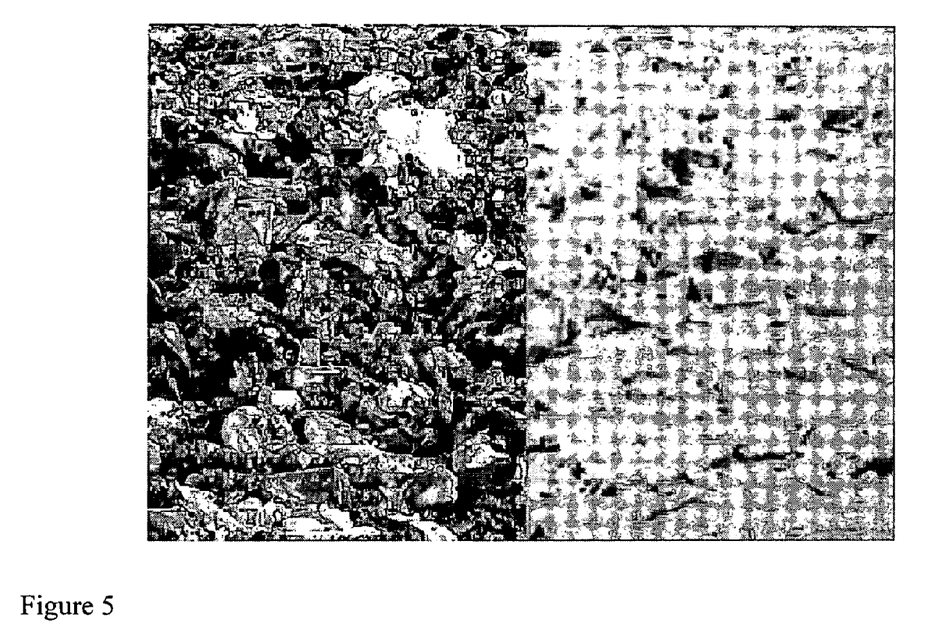
FIG. 5 is a photograph showing the landfilled plastic bags before and after being sprayed with the slurry of the present invention.

This formulation was demonstrated at a landfill site. FIG. 4 shows the spraying of the slurry using a conventional hydroseeding machine. The slurry can be easily pumped and sprayed onto the landfilled wastes. FIG. 5 shows the landfilled plastic bags before and after spraying. The slurry stuck onto the plastic bags and formed a very continuous cover. The cover was visually examined during the first week after the spray. Although it rained significantly during that week, the cover did not show an obvious deterioration.

TABLE 1

Mixture

| Constituent Type | | Percentage by weight | Percentage by weight |
|---|---|---|---|
| Water | Tap water | 40 | 30–50 |
| Binder | Portland cement | 15 | 5–30 |
| Powder filler | Ground glass powder | 38 | 20–50 |
| Fiber | Shredded paper fiber | 2 | 0.5–5 |
| AEA | Latex emulsion (48% solid) | 5 | 1–10 |

EXAMPLE 2

In another experiment, ASTM Class C fly ash was used as a binder and redispersible polymer powder was used as an adhesion enhancing agent. These constituents were mixed as previously discussed. The mixture was then applied as a continuous cover on a tray of waste materials containing glass bottles and plastic wrapped wastes.

The cover over the tray of soil was placed in the ambient outdoor environment and exposed to sunlight and rain during the month of July for a period of more than four weeks and has undergone more than 20 cycles of wet and dry weather yet remains in excellent condition with minimal shrinkage and no cracking.

TABLE 2

Mixture

| Constituent Type | | Percentage by weight | Percentage by weight |
|---|---|---|---|
| Water | Tap water | 43 | 30–50 |
| Binder | Class C fly Ash | 20 | 10–40 |
| Powder filler | Kaolinite clay | 33 | 20–50 |
| Fiber | Shredded paper fiber | 2 | 0.5–5 |
| AEA | Redispersible polymer powder | 2 | 0.5–5 |

EXAMPLE 3

In another experiment, calcined gypsum was used as a binder and latex paint sludge was used as an adhesion enhancing agent. The mixing and application processes were the same as described in Example 1 above. The sprayed cover hardened within one hour and exhibited a very smooth appearance.

The cover over the tray of soil was placed in the ambient outdoor environment and exposed to sunlight and rain during the month of July for a period of more than four weeks and has undergone more than 20 cycles of wet and dry weather yet remains in excellent condition with minimal shrinkage and no cracking.

TABLE 3

Mixture

| Constituent Type | | Percentage by weight | Percentage by weight |
|---|---|---|---|
| Water | Tap water | 40 | 30–50 |
| Binder | Calcined gypsum | 15 | 5–30 |
| Powder filler | Kaolinite clay | 38 | 20–50 |
| Fiber | Shredded paper fiber | 2 | 0.5–5 |
| AEA | Latex paint sludge (45% solid) | 5 | 2–10 |

EXAMPLE 4

In another experiment, Portland cement was used as a binder, methyl carboxymethyl cellulose was used as a thickening agent, and latex paint sludge was used as an adhesion enhancing agent. The mixing and application processes were the same as described as in Example 1 above. The sprayed cover hardened within a couple of hours and exhibited a very smooth appearance.

TABLE 4

Mixture

| Constituent Type | | Percentage by weight | Percentage by weight |
|---|---|---|---|
| Water | Tap water | 47.5 | 30–50 |
| Binder | Portland cement | 10 | 5–30 |
| Powder filler | Kaolinite clay | 35 | 20–50 |
| Fiber | Shredded paper fiber | 2 | 0.5–5 |
| Thickening agent | Methyl carboxymethyl cellulose | 0.5 | 0.05–5 |
| AEA | Latex paint sludge (45% solid) | 5 | 2–10 |

The forgoing has described the invention and certain embodiments thereof. It is to be understood that the invention is not necessarily limited to the precise embodiments described therein but variously practiced with the scope of the following claims.

We claim:

1. A bulk material cover, which comprises:
   (a) about 30 to about 70 weight percent liquid;
   (b) about 5 to about 60 weight percent cementitious material;
   (c) about 0.1 to 5 weight percent water-dispersible polymer comprising a member selected from the group consisting of water-based paint and paint sludge;
   (d) up to about 60 weight percent inert filler; and
   (e) up to about 20 weight percent fiber, wherein the indicated weight percents are based on total weight of the material.

2. The cover according to claim 1, wherein the liquid is selected from the group consisting of landfill leachate, water and wastewater.

3. The cover according to claim 1, wherein the cementitious material is selected from the group consisting of portland cement, blended cement, masonry cement, calcium aluminate, slag cement, alkali-activated slag cement, coal fly ash, cement kiln dust, calcined gypsum, and any mixture thereof.

4. The cover according to claim 1 wherein the water-based paint is waste water-based paint.

5. The cover according to claim 1 wherein the powder filler is selected from the group consisting of clay, ground recycled glass, shredded construction debris, demolition debris, sand, crushed stone dust, and any mixture thereof.

6. The cover according to claim 1, wherein the fiber is selected from the group consisting of shredded paper, shredded wood, polyethylene terephthalate, chopped straw, hay, and any mixture thereof.

7. The cover of claim 1 containing up to about 3% thickening agent.

8. The cover according to claim 7, wherein the thickening agent is selected from the group consisting of methyl cellulose, methyl hydroxypropyl cellulose, hydroxyethyl cellulose, and hydroxypropyl cellulose, and mixtures thereof.

9. The cover of claim 1 containing up to about 3% pigment.

10. The cover of claim 1 containing a chemical odor control additive.

* * * * *